June 2, 1964  G. E. FRANCK  3,135,050
MANUALLY OPERABLE TUBE CUTTER WITH MOVABLE CUTTER BLADE
Filed Nov. 26, 1962

Inventor:
George E. Franck
By: Hofgren, Brady, Wegner,
Allen & Stellman
Attorneys United States Patent Office 3,135,050
Patented June 2, 1964

3,135,050
MANUALLY OPERABLE TUBE CUTTER WITH MOVABLE CUTTER BLADE
George E. Franck, Morton Grove, Ill., assignor to Imperial-Eastman Corporation, a corporation of Illinois
Filed Nov. 26, 1962, Ser. No. 240,048
3 Claims. (Cl. 30—102)

This invention relates to cutters and in particular to manually operable tube cutters.

In one well known form of manually operable tube cutter, a body member is provided having a shank portion for carrying a rod having a cutting wheel on one end in axial alignment with a tube holding means at an opposite spaced portion of the body member. The present invention comprehends a novel tube cutter having a body member and cutter wheel arranged in a novel manner providing facilitated use and economy of construction.

Thus, a principal object of the present invention is the provision of a new and improved tube cutter.

Another object of the invention is the provision of such a tube cutter having improved compactness and simplicity of construction.

A further object of the invention is the provision of such a tube cutter having a novel arrangement providing improved rigidity and maintained alignment of the cutter wheel, thereby effectively precluding threaded cutting of the tube.

Still another object of the invention is the provision of such a tube cutter comprising a body member having a first portion defining a forwardly opening tube holding recess, and a second portion extending forwardly away from the first portion and defining a guide extending substantially parallel to the direction of opening of the recess, a block movably carried on the guide and having a support portion aligned with the recess, a cutter on the support, and cooperating means on the body member and block including means rearwardly of the first portion of the body member for adjusting the spacing between the cutter and the first portion of the body member to urge the cutter into the wall of a tube retained in the recess.

Other objects and advantages of the invention will be apparent from the following description taken in connection with the accompanying drawing wherein.

Figure 1:
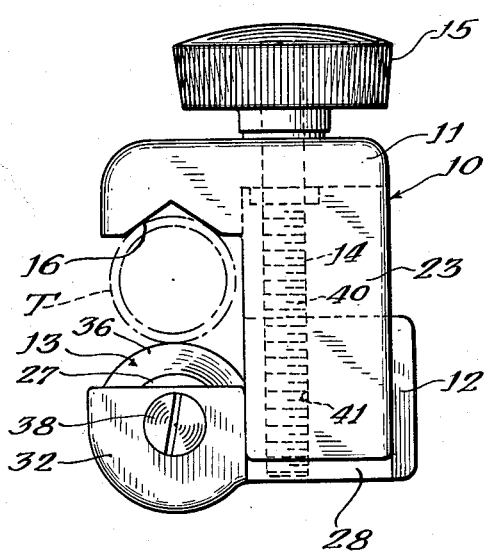
FIGURE 1 is a side elevation of a tube cutter embodying the invention with a portion of a tube to be cut in cutting position therein being shown in broken lines.
Figure 2:
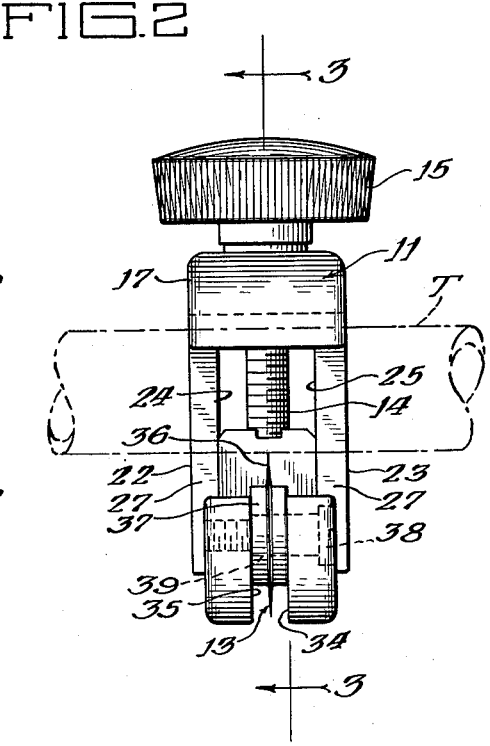
FIGURE 2 is a front elevation thereof.

In the exemplary embodiment of the invention as disclosed in the drawing, a tube cutter generally designated 10 is shown to comprise a body member 11, a support block 12, a cutter wheel 13, and an adjusting screw 14 having a manipulating knob 15 at one end thereof. The support block 12 is slidably carried by the body member 11 and in turn carries the cutter wheel 13 for adjustable spacing of the cutter wheel from a recess 16 in one end of the body member and arranged to retain the tube T to be cut. Thus, by suitably rotating the knob 15, the support block 12 may be suitably urged to press the cutter wheel 13 into the wall of the tube whereupon swinging of the tube cutter about the axis of the tube causes the tube wall to be annularly cut. Progressive advance of the cutter wheel into the tube during such swinging of the cutter about the axis of the tube effects a continuing deepening of the cut until the cutter wheel has cut fully through the tube wall, thereby completely severing the tube into two portions.

Figure 3:
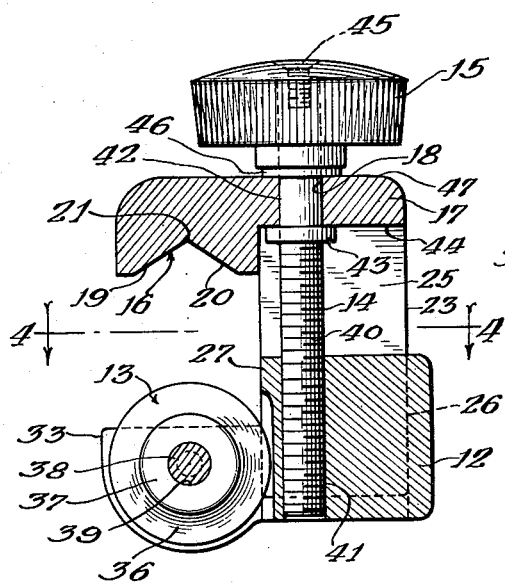
FIGURE 3 is a longitudinal section thereof taken substantially along the line 3—3 of FIGURE 2.

More specifically, the body member 11 comprises a first end portion 17 through which extends a bore 18. The end portion 17 further defines the recess 16 which, as shown in FIGURE 3, comprises a wedge-shaped, forwardly opening recess including first planar surface 19 and second planar surface 20 intersecting in a line 21.

The body member further includes a second portion comprising a guide, or slide, 48 defined by a pair of slide portions 22 and 23 which project from end portion 17 parallel to the axis of opening 18 which define confronting planar surfaces 24 and 25 spaced apart a preselected distance and respectively extending in planes perpendicular to line 21 and parallel to the axis of opening 18. Slide portions 22 and 23 further respectively define end surfaces 26 and 27 extending parallel to line 21 and perpendicular to the planes of surfaces 24 and 25.

Figure 4:
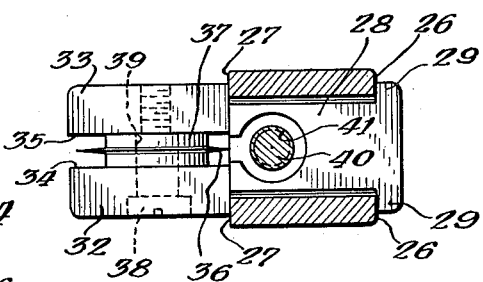
FIGURE 4 is a transverse section thereof taken substantially along the line 4—4 of FIGURE 3.

Support block 12 includes a slide portion 28 which is received between slide portions 22 and 23 in sliding engagement with surfaces 24 and 25. As best seen in FIGURE 4, the support block includes at one end a pair of outturned flanges 29 slidably engaging the end surfaces 26 of the slide portions 22 and 23. The opposite end of the support block comprises a support portion 49 comprising a pair of lugs 32 and 33 which define confronting spaced surfaces 34 and 35, respectively. Cutter wheel 13 includes a cutting disc portion 36 and a hub portion 37 having an axial thickness equal to the spacing between surfaces 34 and 35, as shown in FIGURE 4. A retaining screw 38 is secured to the lugs 32 and 33 to extend through a central opening 39 in the cutting wheel hub 37 for mounting the cutting wheel on the lugs 32 and 33 with the plane of the cutting disc 36 perpendicular to line 21 and containing the axis of bore 18. As shown in FIGURE 4, the lugs 32 and 33 extend outwardly beyond the slide portion 28 to overlie the surfaces 27 and thereby cooperate with the flanges 29 to retain the slide portion 28 between the slide surfaces 24 and 25.

The adjusting screw 14 includes a shank portion 40 threadedly received in a threaded bore 41 of the slide block 12. The opposite end 42 of the screw 14 is cylindrical and extends coaxially rotatably through the bore 18 in body member portion 17. Between cylindrical portion 42 and threaded portion 40, the screw is provided with an annular collar 43 bearing against an inner face 44 of body member portion 17. The control knob 15 is fixedly secured to the outer end of the cylindrical portion 42 by suitable means such as screw 45. A washer 46 may be installed between the knob 15 and the outer surface 47 of body member portion 17. Thus, screw member 14 is axially fixed and rotatably mounted in the body member portion 17, so that rotation of the cutter knob 15 causes selective advancement and retraction of the slide block 12 for corresponding movement of the cutting wheel 13 toward and away from the recess 16 and thusly into and from a tube T carried in the recess.

The tube cutter 10 is employed by inserting the tube T to be cut in recess 16 with the axis of the tube parallel to the line 21. Knob 15 is then manipulated to bring the disc portion 36 of the cutter wheel 13 into engagement with the wall of the tube. The tube cutter is then swung about the axis of the tube to score the wall in an annular path. Upon completion of this scoring operation, the knob 15 is then further tightened to cause the disc portion 36 of wheel 13 to dig further into the wall, whereupon a subsequent swinging of the tube cutter about the axis of the tube is effected. This operation is continued until the tube cutter completely penetrates the tube wall to complete the cutting operation.

By virtue of the substantial surface engagement of the slide block 12 with the slide portions 22 and 23, the cutter wheel 13 is maintained accurately in a single plane perpendicular to the line 21 and thus to the axis of the tube T being cut. Thus, threading of the tube wall is effectively precluded, assuring an accurate planar cut of the tube T.

As the screw member 14 extends forwardly from the portion of the body member defining the tube holding recess 16 to the slide block 12, the over-all size of the tube cutter is effectively minimized. Thus, the tube cutter may be made extremely small offering a substantial advantage where the use thereof is in instrumentation and similar small tube diameter installations. In such installations the conventional tube cutters have been impractical because of the substantial extent thereof precluding swinging of the tube cutter in the cutting operation as a result of interference of the tube cutter with closely adjacent tubes and the like. The extreme small size of the present tube cutter by its compact structure permits effectively minimum clearances from the tube being cut, thereby substantially facilitating the tube cutting operations in such applications.

While I have shown and described one embodiment of my invention, it is to be understood that it is capable of many modifications. Changes, therefore, in the construction and arrangement may be made without departing from the spirit and scope of the invention as defined in the appended claims.

I claim:

1. A tube cutter comprising: a body member having a first portion defining a forwardly opening tube holding recess, and a second portion integral with and extending forwardly away from said first portion and defining a guide extending substantially parallel to the direction of opening of said recess; a block movably carried on said guide and having a support portion aligned with said recess; a cutter on said support portion; and cooperating means on said body member and block including means rearwardly of said first portion of the body member for adjusting the spacing between the cutter and said first portion of the body member to urge the cutter into the wall of a tube retained in said recess.

2. A tube cutter comprising: a body member having a first portion defining a forwardly opening tube holding recess, an end portion rearwardly of the transverse plane of the most rearward portion of the recess, and a second portion integral with and extending forwardly away from said end portion and defining a slide extending substantially parallel to the direction of opening of said recess; a block slidably carried on said slide and having a support portion aligned with said recess; a cutter wheel on said support portion, said block extending to rearwardly of the transverse plane of the most rearward portion of the cutter wheel; and cooperating means on said body member and block including means rearwardly of said first portion of the body member for adjusting the spacing between the cutter wheel and said first portion of the body member to urge the cutter wheel into the wall of a tube retained in said recess.

3. The tube cutter of claim 1 wherein said second portion extends forwardly of the transverse plane of the most forward portion of said recess a distance less than the maximum spacing of said cutter from said recess.

References Cited in the file of this patent

UNITED STATES PATENTS

| | | |
|---|---|---|
| 603,662 | Snedeker | May 10, 1898 |
| 1,217,305 | Harbeckes | Feb. 27, 1917 |
| 2,126,951 | Dobrick | Aug. 16, 1938 |
| 2,941,291 | Fritch | June 21, 1960 |